US008250067B2

(12) United States Patent
Li et al.

(10) Patent No.: US 8,250,067 B2
(45) Date of Patent: *Aug. 21, 2012

(54) ADDING DOMINANT MEDIA ELEMENTS TO SEARCH RESULTS

(75) Inventors: Ming Jing Li, Beijing (CN); Shuming Shi, Beijing (CN); Wei-Ying Ma, Beijing (CN); Zhiwei Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,286

(22) Filed: Jul. 14, 2011

(65) Prior Publication Data

US 2011/0270821 A1 Nov. 3, 2011

Related U.S. Application Data

(63) Continuation of application No. 12/196,208, filed on Aug. 21, 2008, now Pat. No. 7,996,395, which is a continuation of application No. 11/166,775, filed on Jun. 24, 2005, now Pat. No. 7,433,895.

(51) Int. Cl.
*G06F 17/30* (2006.01)
(52) U.S. Cl. .................. 707/723; 707/805; 715/234
(58) Field of Classification Search .................. 707/723, 707/728, 748, 805, 999.101, 999.107; 715/205, 715/234

See application file for complete search history.

(56) References Cited

U.S. PATENT DOCUMENTS

| | | | |
|---|---|---|---|
| 6,271,840 B1 | 8/2001 | Finseth et al. | |
| 6,643,641 B1 | 11/2003 | Snyder | |
| 6,814,779 B2 | 11/2004 | Toyama | |
| 7,433,895 B2 * | 10/2008 | Li et al. ................................ 1/1 |
| 7,996,395 B2 * | 8/2011 | Li et al. ......................... 707/723 |
| 2001/0056418 A1 | 12/2001 | Youn | |
| 2003/0195883 A1 | 10/2003 | Mojsilovic et al. | |
| 2003/0229628 A1 | 12/2003 | Banerjee et al. | |
| 2003/0231806 A1 | 12/2003 | Troyanker | |
| 2004/0101156 A1 * | 5/2004 | Kacker ........................ 382/100 |
| 2004/0243541 A1 | 12/2004 | Zhang et al. | |
| 2005/0120311 A1 * | 6/2005 | Thrall ............................ 715/811 |
| 2005/0223027 A1 | 10/2005 | Lawrence et al. | |

FOREIGN PATENT DOCUMENTS

| | | |
|---|---|---|
| EP | 1 089 198 A2 | 4/2001 |
| GB | 2402470 | 8/2004 |
| WO | WO-2002039207 A2 | 5/2002 |

(Continued)

OTHER PUBLICATIONS

Almeida Tatiana et al., "Image Retrieval Using Multiple Evidence Ranking," IEEE Transactions on Knowledge and Data Engineering, vol. 16, No. 4, Apr. 2004 (10 pages).

(Continued)

*Primary Examiner* — Cheryl Lewis
(74) *Attorney, Agent, or Firm* — Perkins Coie LLP

(57) ABSTRACT

A method and system for determining dominance of the media elements of display pages is provided. The dominance system provides a scoring mechanism for scoring the dominance of media elements of display pages based on features of each media element of the display page. To generate the scores for the media elements of the display page, the dominance system first identifies the media elements and then identifies the features of the media elements. The dominance system then scores the identified media elements using the provided scoring mechanism and the identified features.

20 Claims, 15 Drawing Sheets

FOREIGN PATENT DOCUMENTS

| | | |
|---|---|---|
| WO | WO-2003/102619 | 12/2003 |
| WO | WO-2004/046982 | 6/2004 |

OTHER PUBLICATIONS

Arentz, Will Archer et al., "Classifying offensive sites based on image content," Computer Vision and Image Understanding, Elsevier Inc., 2003.

Brin, Sergey, "The Anatomy of a Large-Scale Hypertextual Web Search Engine," Computer Science Department, Stanford University, Stanford, California (26 pages) http://www7.scu.edu.au/programme/fullpapers/1921/com1921.html.

Cai, Deng et al., "Hierarchical Clustering of WWW Image Search REsults Using Visual, Textual and Link Information," MM, Oct. 10-16, 2004, New York, New York, Copyright 2004 (8 pages).

Fan, Jianping et al., "Multi-Level Annotation of Natural Scenes Using Dominant Image Components and Semantic Concepts," ACM Multimedia, 2004.

Freund, Yoav et al., "An Efficient Boosting Algorithm for Combining Preferences," Journal of Machine Learning Research 4, 2003 (37 pages).

Google Zeitgeist, Search Patterns, Trends and Surprises According to Google (3 pages) http://www.google.com/press/zeitgeist.html.

Hartmann, Alexander et al., "Automatic Classification of Images on the Web,"Intel Corporation (10 pages).

Jay et al., How People Use Presentation To Search For a Link: Expanding The Understanding Of Accessibility On The Web, Universal Access in the Information Society, 2007.

Joachims, T., "Optimizing Search Engins Using Clickthrough Data," In proceeding of the ACM Conference on Knowledge Discovery and Data Mining, 2002 (10 pages).

Liu, Hao et al., "Effective Browsing of Web Image Search Results," MIR, ACM, 2004.

Lu, Guojun et al., "An Integrated WWW Image Retrieval System,"Copyright 1999, Guojun Lu and Ben Williams (9 pages).

Poulson, David et al., "Making the internet accessible for people with cognitive and communication impairments," Universal Access in the Information Society, Springer Berlin/Heidelberg, vol. 3, Mar. 2004.

Ratsch, Gunnar et al., Soft Margins for AdaBoost, NeuroCOLT2 Technical Report Series, NC-TR-1999-021, Sep. 1998 (28 pages).

Sclaroff, Stan et al., "ImageRover: A Content-Based Image Browser for the World Wide Web," BU CS TR97-005, IEEE Workshop on Content-based Access of Image and Video Libraries, Jun. 1997, pp. 1-8.

Tong, Hanghang et al., "Learning No-Reference Quality Metric by Examples," Department of Automation, Tsinghua University, Beijing, China (8 pages).

Vapnik, Vladimir N. "Chapter 4 Controlling the Generalization Ability of Learning Processes," The Nature of Statistical Learning Theory, Springer-Verlag New York, Inc., 1995, pp. 89-118.

Wang, Zhou et al., "Image Quality Assessment: From Error Visibility to Structural Similarity," IEEE Transactions on Image Processing, vol. 13, No. 4, Apr. 2004 (13 pages).

Wynblatt, M et al., Web page caricatures:Multimedia Summaries for WWW Documents', 1998, Proceedings, IEEE, Jun. 28-Jun. 1, 1998.

Xiao, Rong et al., "Boosting Chain Learning for Object Detection," Proceedings of the Ninth IEEE International Conference on Computer Vision (ICCV 2003), 2003 (7 pages).

Xue, Gui-Rong et al., "Optimizing Web Search Using Web Clickthrough Data," CIKM, ACM, 2004, pp. 118-126.

\* cited by examiner

ADDING DOMINANT MEDIA ELEMENTS TO SEARCH RESULTS

CROSS REFERENCE TO RELATED APPLICATIONS

This application is a continuation application of U.S. patent application Ser. No. 12/196,208 now U.S. Pat. No.7, 996,395, filed on Aug. 21, 2008, entitled "ADDING DOMINANT MEDIA ELEMENTS TO SEARCH RESULTS," which is a continuation of U.S. application Ser. No. 11/166, 775 filed on Jun. 24,2005, entitled "ADDING DOMINANT MEDIA ELEMENTS TO SEARCH RESULTS," issued as U.S. Pat. No. 7,433,895 on Oct. 7, 2008, both of which are incorporated herein in their entirety by reference.

BACKGROUND

Many search engine services, such as Google and Overture, allow users to search for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The search engine service can identify keywords of any particular web page using various well-known information retrieval techniques, such as identifying the words of a headline, the words supplied in the metadata of the web page, the words that are highlighted, and so on. The search engine service then creates an index that maps keywords to web pages.

To identify the web pages that may be related to a search request, the search engine service uses the index to find web pages with keywords that best match the search request. The search engine service may generate a relevance score to indicate how relevant the information of the web page may be to the search request based on the closeness of each match, web page importance or popularity (e.g., Google's PageRank), and so on. The search engine service then displays the search results to the user as links to those web pages in an order that is based on a ranking determined by their relevance. The search engine services typically also display textual excerpts derived from each web page alongside the links. The textual excerpt may include the title of the web page, summary associated with the web page, portions of the web page that contain the words of the search request, and so on. Based on review of the textual excerpts and the rankings, the user can select web pages to view.

Users often need to select and view many web pages of a search result before locating a web page of interest for various reasons. One reason is that the ranking may not accurately represent the relevance of the web page. For example, an attorney who submits the query "L.A. court time" may get the same query result as an athlete who submits the same query. In such a case, web pages related to superior court times in Los Angeles County may be relevant to the attorney, but irrelevant to the athlete who may be interested in web pages related to sport court times of the Los Angeles Parks and Recreation Department. A search engine service may not know whether the user is interested in law or sports and thus cannot always rank the web pages based on the relevance to the user. Another reason that users may need to view many web pages before finding one of interest is that the textual excerpt displayed with the query result may not provide enough information to determine the relevance of the web page. For example, the textual excerpt of a query result may state, "This web page helps you check on L.A. court times at your convenience . . . if you need to arrange a court time . . . Please arrive 15 minutes before your scheduled court time." In such a case, the user may not know whether the web page is about legal or sport courts.

When users cannot quickly find web pages of interest using a search engine service, they may stop using that search engine service and start using a different search engine service. Since search engine services may derive significant benefits from having many users use their services, the loss of users resulting from difficulties in locating web pages of interest can be a significant problem.

SUMMARY

A method and system for determining dominance of the media elements of display pages is provided. A dominant media element is one that is an important and informative media element of its display page and may be substantially related to a topic or theme of its display page. The dominance system provides a scoring mechanism for scoring the dominance of media elements of display pages based on features of each media element of the display page. The scoring mechanism generates a score based on the identified features and provides a rating of the dominance of a media element of the display page. To generate the scores for the media elements of the display page, the dominance system first identifies the media elements and then identifies the features of the media elements. The dominance system then scores the identified media elements using the provided scoring mechanism and the identified features. The media element with a score indicating the highest dominance may be considered the most dominant media element of the display page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method and system for determining dominance of the media elements of display pages is provided. A dominant media element is one that is an important and informative media element of its display page and may be substantially related to a topic or theme of its display page. The dominance system provides a scoring mechanism for scoring the dominance of media elements of display pages based on features of each media element of the display page. The scoring mechanism generates a score based on the identified features and provides a rating of the dominance of a media element of the display page. To generate the scores for the media elements of the display page, the dominance system first identifies the media elements and then identifies the features of the media elements. The dominance system then scores the identified media elements using the provided scoring mechanism and the identified features. The media element with a score indicating the highest dominance may be considered the most dominant media element of the display page.

The dominance system may use the dominant media element of a web page to augment search results that are provided to a user. A search engine service may use the dominance system to score the dominance of images of web pages before it receives a search request. After the search results are generated, the dominance system selects the dominant image of a web page. When the search engine service identifies web pages that are relevant to a search request, it can display a textual excerpt and the dominant image for each of the identified web pages. If a web page has multiple dominant images, then the search engine service may use the dominance system to identify the dominant image that is most relevant to the search request.

DETAILED DESCRIPTION

Figure 1:
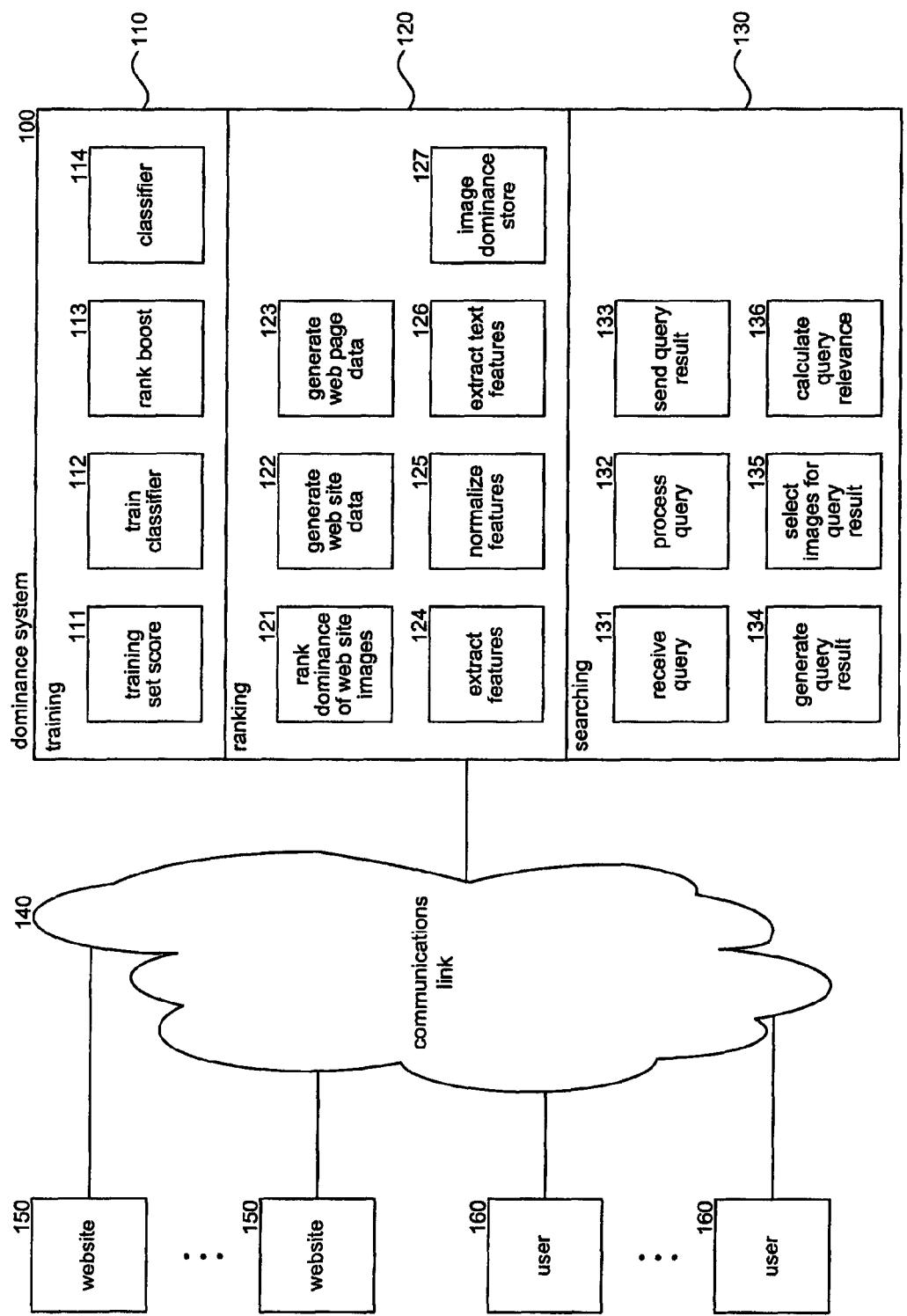
FIG. 1 is a block diagram that illustrates components of the dominance system in one embodiment.

A method and system for determining dominance of the media elements of display pages is provided. A dominant media element is one that is an important and informative media element of its display page and may be substantially related to a topic or theme of its display page. For example, a display page describing the White House in Washington, D.C. may include a photograph of the White House and an image of the Presidential seal. The photograph of the White House may be considered to be a dominant media element of the display page, and the image of the Presidential seal may be considered to be a non-dominant media element. In one embodiment, the dominance system provides a scoring mechanism for scoring the dominance of media elements of display pages based on features of each media element of the display page. For example, a media element may be an image (e.g., a photograph of a person), a graphical element (e.g., a pie chart), or some other type of non-text element of a display page. The features of a media element may include the size of the media element, the location of the media element on the display page, and so on. The scoring mechanism generates a score based on the identified features and provides a rating of the dominance of a media element of the display page. To generate the scores for the media elements of the display page, the dominance system first identifies the media elements and then identifies the features of the media elements. The dominance system then scores the identified media elements using the provided scoring mechanism and the identified features. The media element with a score indicating the highest dominance may be considered the most dominant media element of the display page.

In one embodiment, the dominance system uses the dominant media element of a web page to augment search results that are provided to a user. For example, when the web page describes the White House and includes an image of the White House, then that image of the White House may be displayed with the search results. The display of an image as part of the search result may help the person who submitted the search request to determine whether a web page is relevant to the search request. A search engine service may use the dominance system to score the dominance of images of web pages before it receives a search request. For example, the search engine service may calculate the scores for the images of web pages as part of its crawling process. After the search results are generated, the dominance system selects the dominant image of a web page. When the search engine service identifies web pages that are relevant to a search request, it can display a textual excerpt and the dominant image for each of the identified web pages. The textual excerpt associated with web pages may be identified in a conventional manner. If a web page has multiple dominant images, then the search engine service may use the dominance system to identify the dominant image that is most relevant to the search request. To identify the most relevant image, the dominance system compares text surrounding each dominant image to the search request. The dominance system selects as the most relevant image the dominant image whose surrounding text is most similar to the search request. In this way, the dominance system can augment conventional presentation of search results for web pages with dominant images that are most relevant to the search request.

In one embodiment, the dominance system generates the scoring mechanism by training a classifier to classify web pages based on their dominance. The dominance system may input training data that includes web pages with images that have been manually classified based on the dominance. For example, the images of the training data may be classified as non-dominant, low dominant, and high dominant. Although it would be desirable if a person could manually input scores for the images of the training data, it can be difficult for people to provide accurate scores, but relatively easy for them to classify the dominance of an image into three classifications. The dominance system may use an adaptive boosting algorithm to train a classifier for the images of the training data to provide a dominance score. Since the training data is only classified into three dominance classifications and the score represents a numerical value of the dominance, the training needs to map the training data into scores. The training is performed under the constraint that the non-dominant images have a lower dominance score than the low dominant images, which have a lower dominance score than the high dominant images. Once a classifier is trained, the dominance system can be used to determine the dominance of the images of web pages.

In one embodiment, the dominance system uses image level features, page level features, and web site level features to represent images of a web page. The image level features are derived from the image itself and may include image size, aspect ratio, image quality, and image category. The image size may be the width of the image times the height of the image. Dominant images tend to be bigger than non-dominant images. The aspect ratio may be the minimum of the width and the height divided by the maximum of the width and the height. Dominant images tend to have larger aspect ratios than non-dominant images. The image quality may be represented by sharpness, contrast, colorfulness, blurness, and so on. Because there are no reference images, the quality of an image needs to be determined from the image itself. The sharpness may be represented by the ratio of "clear" edges to all edges. The contrast may be defined as the ratio of brightness of the foreground to the brightness of the background. The colorfulness may be represented by the number of colors of the image. Dominant images tend to be sharp and colorful images with high contrast. The image category may specify whether the image is a photograph and whether the image contains a human face. Dominant images are more likely to be photographs that contain human faces than non-dominant images.

Since dominant images tend to be the most important and informative images of their web pages, they are often placed on a web page in a position where they will attract user attention. Thus, the page level features include position of the image on the web page and area ratio of the image to the web page. The position may be represented by the x and y coordinates of the image within the web page. Dominant images tend to be located at the center of the top of the web page. The area ratio may be the ratio of the image size to the web page size. Dominant images tend to occupy larger areas of their web pages than non-dominant images.

Web pages typically contain noisy content such as advertisement images, company logo images, decorative images, and so on. This noisy content may have high image qualities and are located in important areas of web pages, but should not be considered dominant images. Noisy content on the web pages of a web site tends to have common characteristics. The web site level features are based on these common characteristics and include an indication of whether an image is external to the web site and an indication of whether an image is duplicated on the web site. An image is external to a web site if it is hosted on a different web site. Dominant images tend to be hosted on the same web site. Non-dominant images, such as advertisements, are commonly hosted on different web sites. An image is a duplicate image if it is present on more than a certain number of web pages or a certain percentage of web pages of a web site. Dominant images tend to appear only on one or a small number of web pages of a web site. Non-dominant images, such as the company logo images, tend to appear on many web pages of a web site.

In one embodiment, the dominance system trains a classifier to generate a real-value score $H(x)$ to rate the dominance of image x. The images of the training data are manually classified as non-dominant, low dominant, and high dominant images with low dominant and high dominant images being considered dominant images. The dominance system uses an algorithm to find a function that maps images to real-value scores and preserves the coherency of the manual classifications. That is, the function ensures that $H(x_0) < H(x_1)$ when image $x_1$ is in a class with higher dominance than the class of image $x_0$. For example, all the images in the high dominant class will have a higher score than any of the images in the low dominant class. The finding of such a function is an ordinal regression problem that is often referred to as a ranking problem.

The dominance system may use a RankBoost algorithm to learn a strong ranking function by combining weak ranking functions. (See Y. Freund, R. Iyer, R. E. Schapire, and Y. Singer, "An Efficient Boosting Algorithm for Combining Preferences," Machine Learning Research, 2003.) A weak ranking function h(x) can be the ordinal of a feature of ranked objects (e.g., the order of the image size) or can be a complex non-linear function of multiple features. The input to the RankBoost algorithm is object pairs $(x_0, x_1)$ denoting an ordinal relationship in which object $x_1$ should be ranked higher than object $x_0$. The dominance system uses object pairs from different manual classes as the input for the RankBoost algorithm. The output of the RankBoost algorithm is a ranking function as represented by the following equation:

$$H(x) = \Sigma_{t=1}^{T} \alpha_t h_t(x) \quad (1)$$

where T is the number of weak ranking functions and $\alpha_t$ is the weight of each function. The RankBoost algorithm uses an iteratively gradient descent algorithm to minimize an exponential loss function as represented by the following equation:

$$J(X) = \sum_{x_0, x_1} \exp(H(x_0) - H(x_1)) = \sum_{x_0, x_1} \exp(-\rho(x_0, x_1)) \quad (2)$$

where $x_0$ and $x_1$ are images of the image pairs and $\rho(x_0, x_1)$ is the difference in the scores of images of a pair as represented by the following equation:

$$\Sigma_{t=1}^{T} \alpha_t (h_t(x_1) - h_t(x_0)) \quad (3)$$

During every iteration, the RankBoost algorithm adjusts the weights of each pair to put more effort (i.e., weights) on pairs that are not accurately ranked. The margin $\rho$ of the RankBoost algorithm is the minimum distance between pairs and is represented by the following equation:

$$\rho = \min_{x_0, x_1} \rho(x_0, x_1) \quad (4)$$

Although the RankBoost algorithm traditionally attempts to maximize the margin, it typically cannot avoid overfitting under noisy environments. If some images of the training data are incorrectly classified, the incorrect classification boundary will be complex. To prevent overfitting, the dominance system uses soft margins rather than hard margins. The soft margins are represented by the following equation:

$$\rho(x_0, x_1) \geq \rho - C\xi(x_0, x_1) \quad (5)$$

where C is a prior chosen constant and $\xi(x_0, x_1)$ is a slack variable. To penalize the overemphasis on noisy samples, the dominance system sets $\xi$ at each iteration as represented by the following equation:

$$\xi(x_0, x_1) = \frac{1}{|\vec{\alpha}_t|} \sum_{j=1}^{t} \alpha_j w_j(x_0, x_1) \qquad (6)$$

where t represents the t-th iteration and $\alpha_t$ represents a t-dimensional weights vector of the ranking functions. $\xi_t(x_0,x_1)$ is the average weight of samples during the learning process. For noisy pairs, the weights and are larger with an iteration. The corresponding partial margin of $(x_0,x_1)$ at the t-th iteration is represented by the following equation:

$$\rho_t(x_0,x_1) = \Sigma_{j=1}^{t} \alpha_j(h_j(x_1) - h_j(x_0)) \qquad (7)$$

The RankBoost algorithm initially sets the weight of each pair $w_1(x_0,x_1)$ to 1/N where N is the number of pairs. The RankBoost algorithm then performs T iterations. The first step of the iteration is to train the next weak ranking function with distribution based on the weights. The second step of the iteration is to calculate $\alpha_t$ as represented by the following equation:

$$\alpha_t = \underset{\alpha_t}{\operatorname{argmin}} \sum_{x_0, x_1} \exp\{-[\rho_t(x_0, x_1) + C\xi_t(x_0, x_1)]\} \qquad (8)$$

The third step of the iteration is to update the weights as represented by the following equation:

$$w_{t+1}(x_0, x_1) = \frac{w_t(x_0, x_1)}{Z_t} \exp\{-[\rho_t(x_0, x_1) + C\xi_t(x_0, x_1)]\} \qquad (9)$$

where $Z_t$ is a normalization constant such that the sum of the weights for all pairs is one. After the final iteration, the final ranking function is H(x) as represented by Equation 1.

In one embodiment, when a web page has multiple dominant images, the dominance system uses text surrounding the images to determine which dominant image is most relevant to the search request. Many different techniques may be used to identify text that is near an image. For example, one technique is to render the web page in memory and analyze its layout to identify the surrounding text based on distance from the image. Another technique is to use rules to identify surrounding text from the HTML document representing a web page (e.g., passages consisting of 20 terms before or after the image). In one embodiment, the dominance system uses a Document Object Model ("DOM") based technique for identifying surrounding text. The DOM represents a document as a tree of nodes. The dominance system builds a tree by adding nodes corresponding to the HTML tags, text blocks, and objects of the HTML document. The dominance system ensures that the nearest sibling nodes represent physically adjacent portions of the HTML document. The dominance system uses a growing algorithm to identify the surrounding text. The dominance system starts at the node of the image and checks surrounding nodes until a text node is found.

In one embodiment, the dominance system uses not only the surrounding text but also other text content, such as web page title and image file name (e.g., extracted from the URL of the image), to determine the relevance of each dominant image to the search request. The dominance system represents each text content as a separate document that is represented by a vector with an entry corresponding to each possible keyword of text content. Each entry of the vector for a document contains the count of the number of times the corresponding keyword is in the document. In one embodiment, the dominance system uses a cosine-based metric to evaluate the similarity of a vector to the search request. The similarity metric is represented by the following equation:

$$s(v, q) = \frac{\vec{v} * \vec{q}}{|\vec{v}| \times |\vec{q}|} = \frac{\sum_{j=1}^{M} w_{vj} \cdot w_{qj}}{\sqrt{\sum_{j=1}^{M} w_{vj}^2} \sqrt{\sum_{j=1}^{M} w_{qj}^2}} \qquad (10)$$

where q is the vector for the search request, v is the vector for a document, and $w_{xj}$ is the j-th entry of vector x. The dominance system combines the similarities of the vectors to provide an overall relevance as represented by the following equation:

$$r(p,q) = \langle \vec{\alpha} \cdot \vec{s} \rangle \qquad (11)$$

where r is the relevance of image p to search request q, $\alpha$ is a coefficient vector indicating the weight of the similarity scores of each text content, and s is a vector of the similarities of the text content. The dominance system may learn the coefficients by analyzing click-through logs and training a classifier such as one that uses the RankBoost algorithm. The dominance system may assume that users browse images of a web page of a search result from top to bottom. If an image is clicked, it may indicate that this image is more relevant than those images higher on the web page but not clicked. The dominance system may use (query, clicked, unclicked) tuples to train the classifier.

In one embodiment, the dominance system may normalize the features of the images of a web page so that the value of a feature of an image is relative to the value of that feature for other images. The dominance system may use a linear function to map the minimum value of each feature to zero and the maximum value of each feature to one. The resulting normalization function is represented by the following equation:

$$f(x) = \begin{cases} 0 & x = \min \\ \frac{x - \min}{\max - \min} & \min < x < \min \\ 1 & x = \max \end{cases} \qquad (12)$$

where f(x) is the normalized value of a feature with the un-normalized value of x and min and max represent the minimum and maximum values for that feature of the images of the web page.

FIG. 1 is a block diagram that illustrates components of the dominance system in one embodiment. The dominance system 100 is connected via communications link 140 to web sites 150 and user computers 160. The dominance system 100 includes a training system 110, a ranking system 120, and a searching system 130. The dominance system in this embodiment is integrated with a search engine. The training system trains a classifier for generating a score for the dominance of images. The training system includes a training set store 111, a train classifier component 112, a RankBoost component 113, and a classifier 114. The training set store contains an identification of web pages that contain images along with the manual classification of each image. The train classifier component trains the classifier using the RankBoost component. The training system also invokes components of the ranking system such as an extract features component. The ranking system ranks the dominance of the images of web pages that are crawled by the search engine. The ranking system includes a rank dominance of web site images component 121, a generate web site data component 122, a generate web page data component 123, an extract features component 124, a normalize features component 125, an extract text features component 126, and an image dominance store 127. The rank dominance of web site images component is invoked to rank the dominance of the images of the web pages of a web site. The rank dominance of web site images component invokes the generate web site data component to generate data for the web site level features. The rank dominance of web site images component invokes the generate web page data component for each web page to generate the data for the page level features. The extract features component extracts the features associated with an image. The normalize features component normalizes the features for the images of a web page. The extract text features component extracts the text surrounding an image and other text features for use in calculating the similarity of the text features to the query. The image dominance store contains an entry for each web page that includes a score for each dominant image of the web page and the text features for each dominant image. The searching system receives queries and identifies relevant images for the query results. The searching system includes a receive query component 131, a process query component 132, a send query result component 133, a generate query result component 134, a select images for query result component 135, and a calculate query relevance component 136. The receive query component receives a query and invokes the process query component to process the query. The process query component invokes the generate query result component to generate the query result and invokes the select images for query result component to select the images for the query result. The select images for query result component invokes the calculate query relevance component to calculate the query relevance of the images to the query based on the text features. The process query component then invokes the send query result component to send the query result.

The computing device on which the dominance system is implemented may include a central processing unit, memory, input devices (e.g., keyboard and pointing devices), output devices (e.g., display devices), and storage devices (e.g., disk drives). The memory and storage devices are computer-readable media that may contain instructions that implement the dominance system. In addition, the data structures and message structures may be stored or transmitted via a data transmission medium, such as a signal on a communications link. Various communications links may be used, such as the Internet, a local area network, a wide area network, or a point-to-point dial-up connection.

The dominance system may be implemented in various operating environments. The operating environment described herein is only one example of a suitable operating environment and is not intended to suggest any limitation as to the scope of use or functionality of the dominance system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The dominance system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
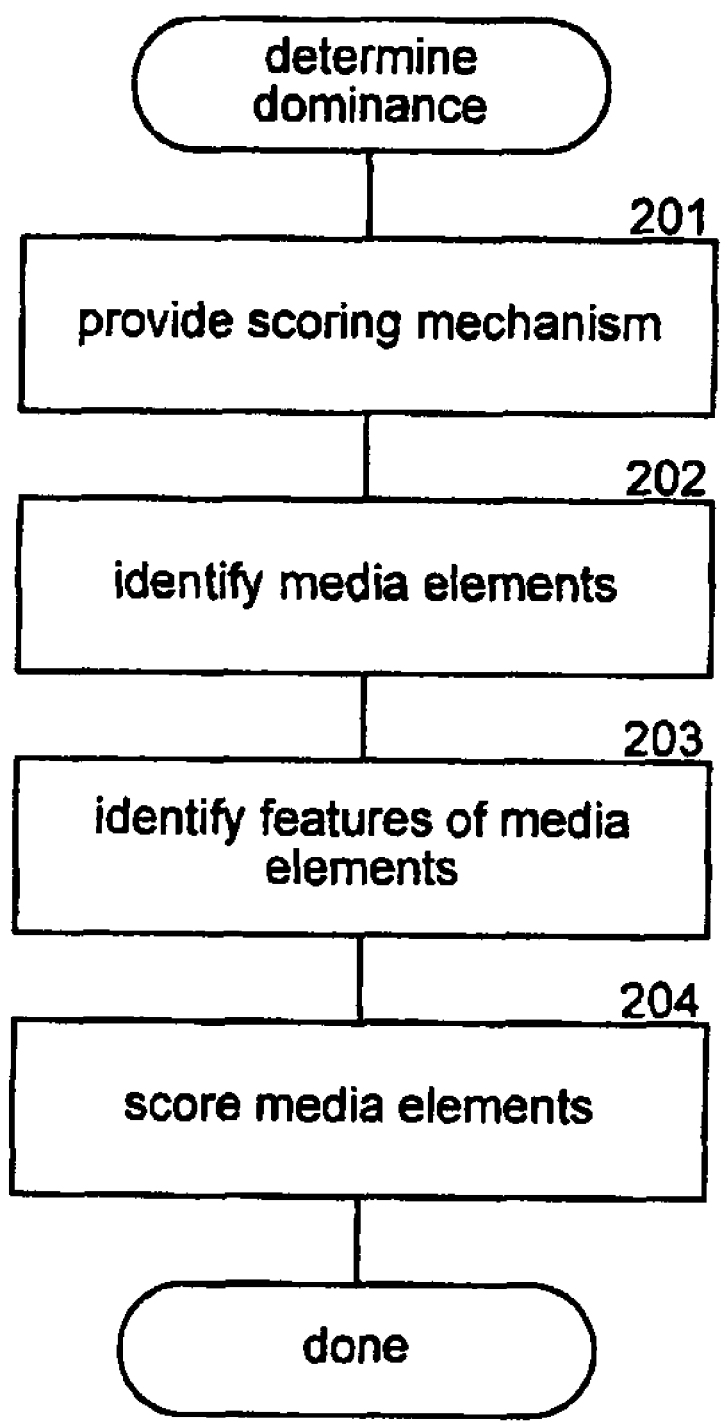
FIG. 2 is a flow diagram that illustrates determining the dominance of images of a display page in one embodiment.

FIG. 2 is a flow diagram that illustrates determining the dominance of images of a display page in one embodiment. In block 201, the component provides a scoring mechanism, such as by training a classifier as described above, for scoring the dominance of the media elements (e.g., images) of a display page (e.g., web page). In block 202, the component identifies the media elements of a display page. In block 203, the component identifies the features of the identified media elements. In block 204, the component scores the dominance of the media elements by submitting the identified features to the scoring mechanism. The component then completes.

Figure 3:
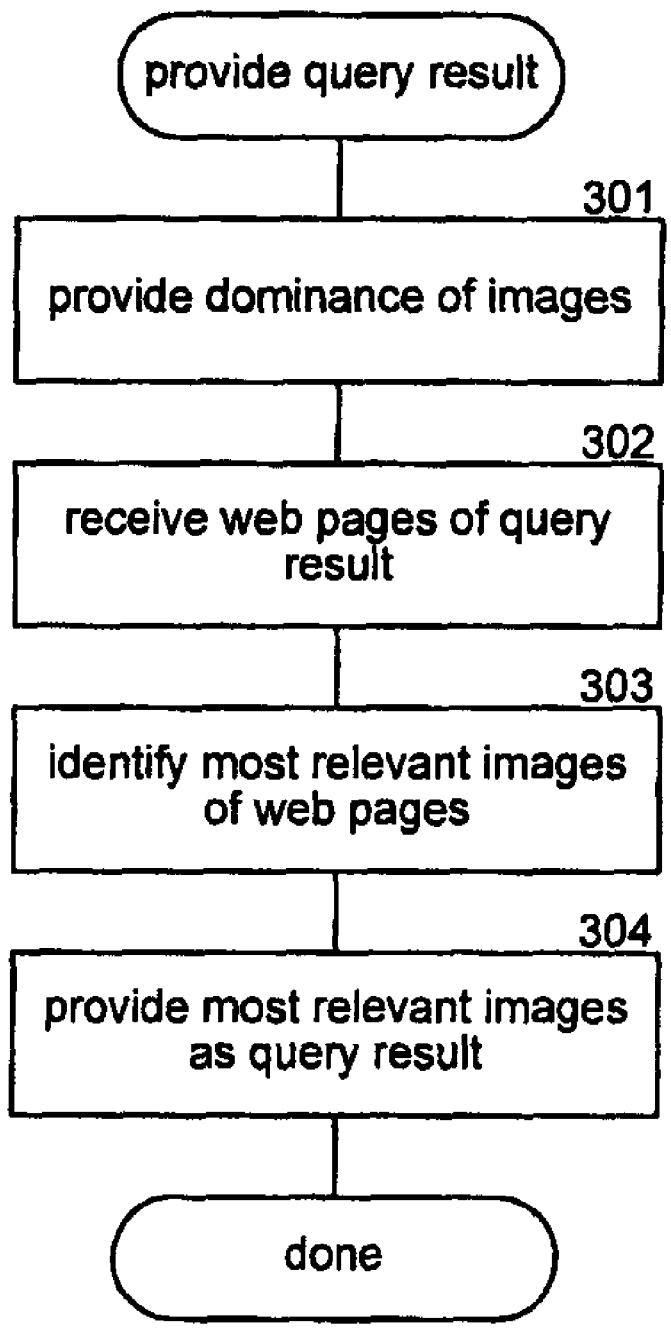
FIG. 3 is a flow diagram that illustrates providing a query result in one embodiment.

FIG. 3 is a flow diagram that illustrates providing a query result in one embodiment. In block 301, the component provides an indication of the dominance of the images of web pages, such as using the ranking system as described above. In block 302, the component receives an indication of the web pages of a query result. In block 303, the component identifies the most relevant image (e.g., based on dominance and/or query relevance) of each web page of the query result. In block 304, the component provides the most relevant image of each web page as part of the query result. The component then completes.

Figure 4:
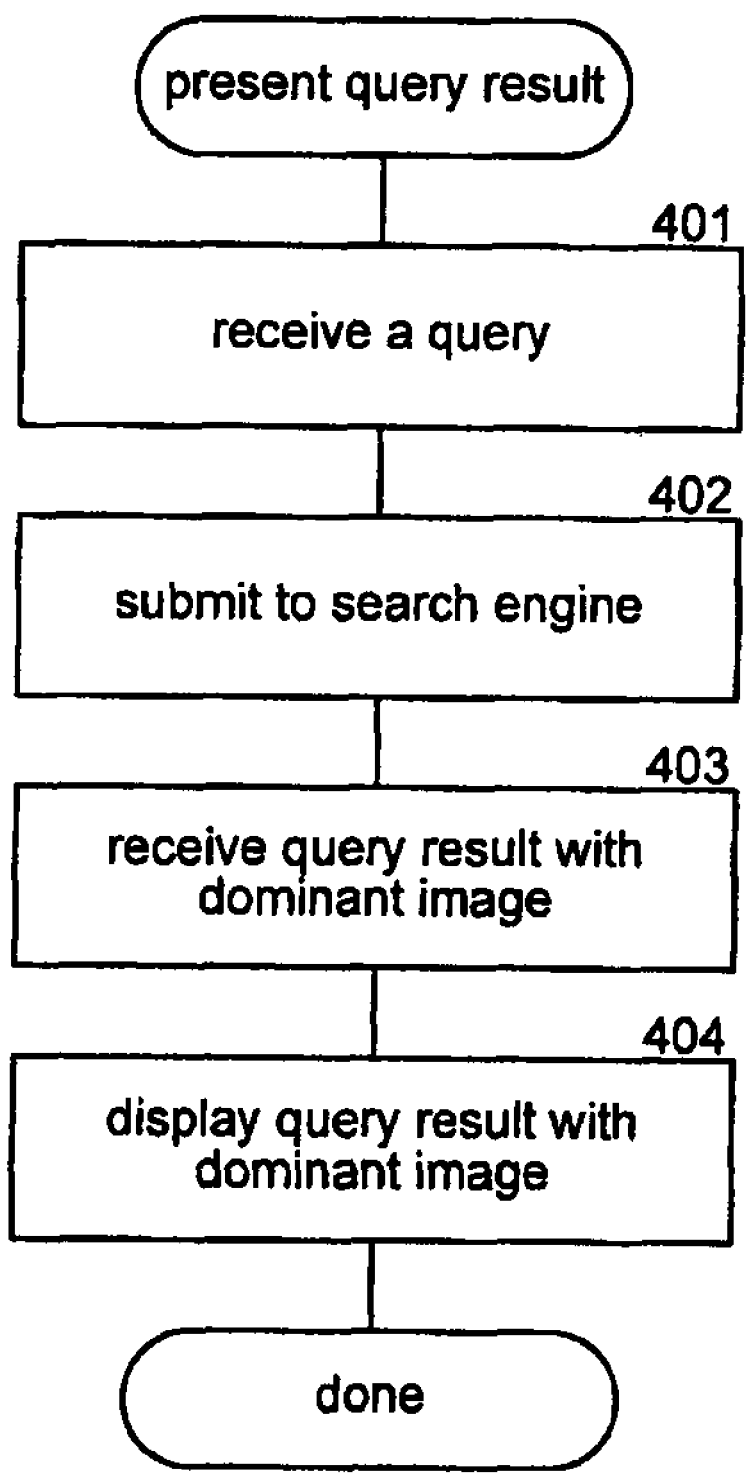
FIG. 4 is a flow diagram that illustrates presenting a query result in one embodiment.

FIG. 4 is a flow diagram that illustrates presenting a query result in one embodiment. In block 401, the component receives a query. In block 402, the component submits the query to a search engine. In block 403, the component receives from the search engine the query result that includes an indication of relevant images of the display pages of the query result. In block 404, the component displays the query result with the relevant images. The component then completes.

Figure 5:
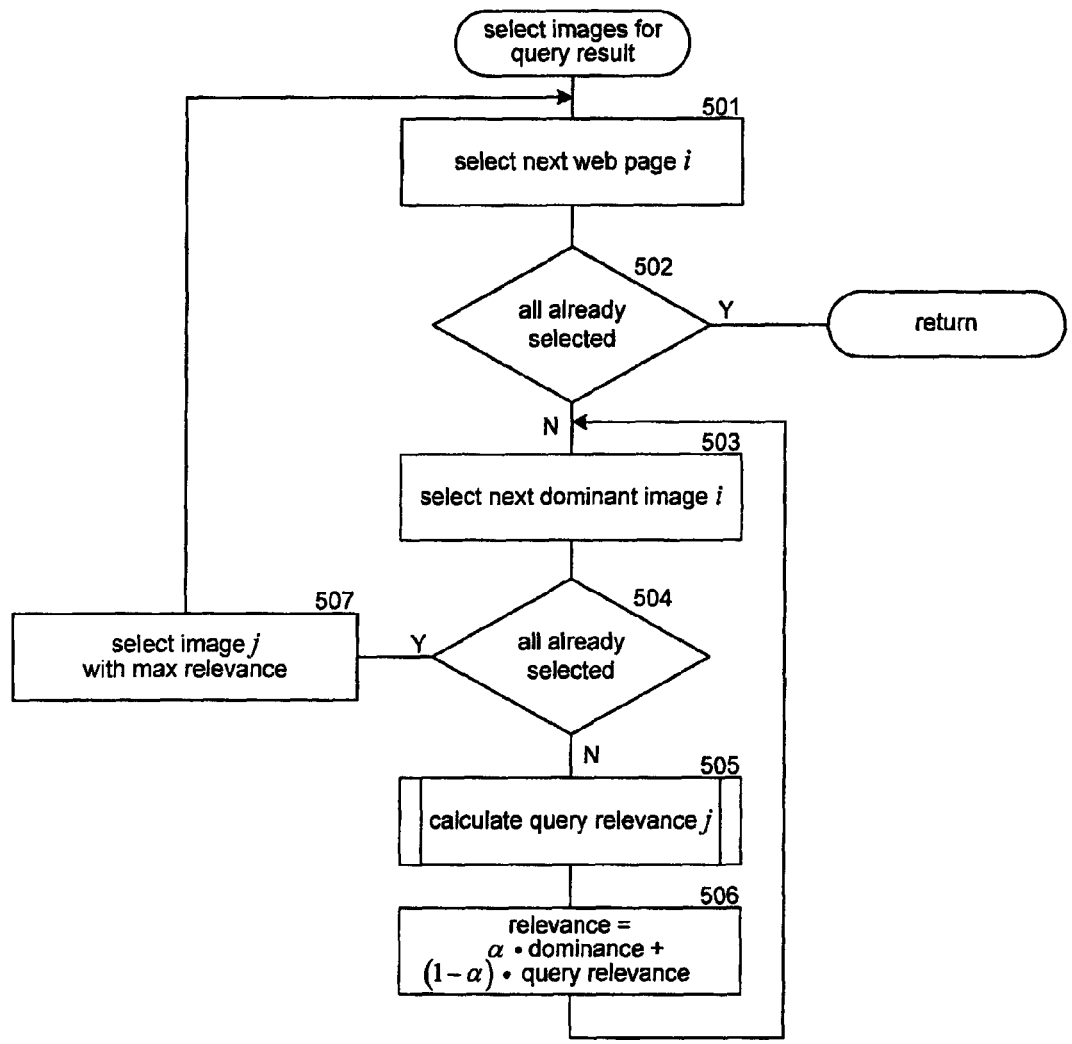
FIG. 5 is a flow diagram that illustrates the processing of the select images for query result component in one embodiment.
Figure 6:
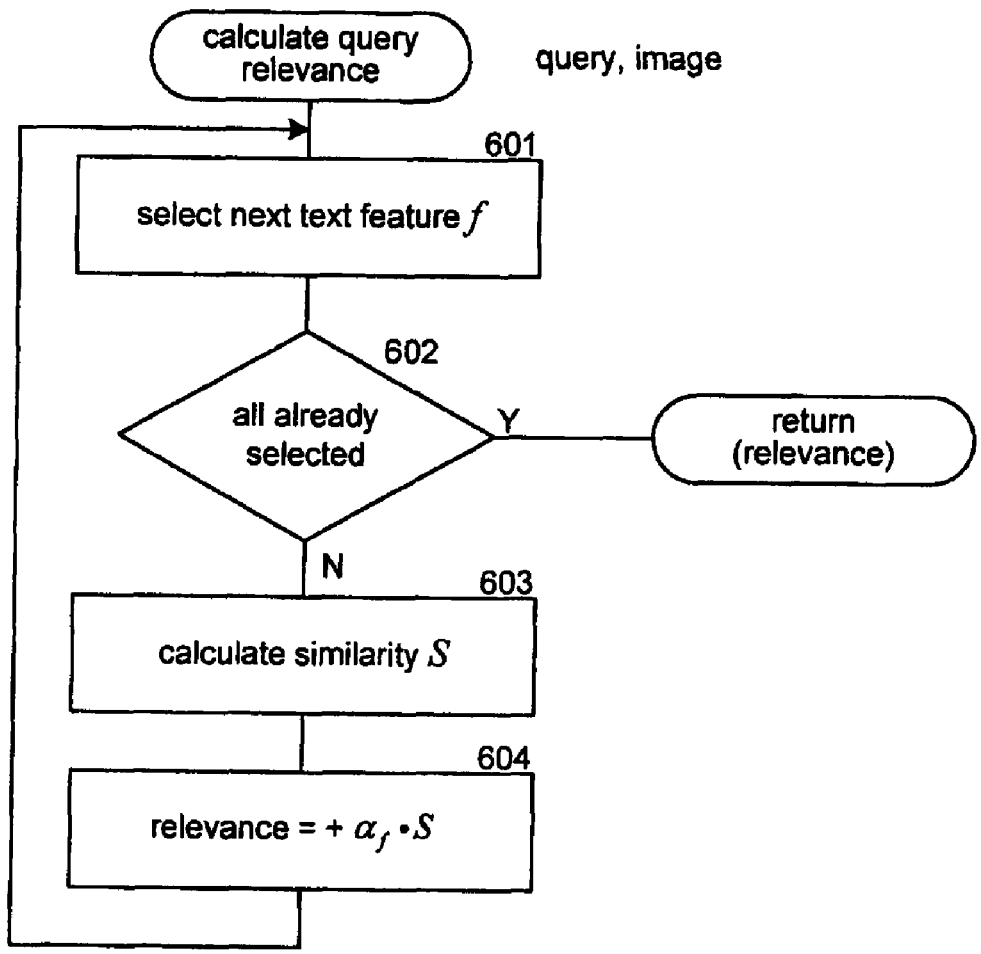
FIG. 6 is a flow diagram that illustrates the processing of the calculate query relevance component of the searching system in one embodiment.

FIGS. 5 and 6 are flow diagrams that illustrate processing of components of the searching system of the dominance system in one embodiment. FIG. 5 is a flow diagram that illustrates the processing of the select images for query result component in one embodiment. The component is passed a query result that includes links to web pages and identifies a relevant image for each web page based on the dominance of the images and the query relevance of the image to the query. In block 501, the component selects the next web page of the query result. In decision block 502, if all the web pages of the query result have already been selected, then the component returns, else the component continues at block 503. In blocks 503-506, the component loops calculating the relevance of each dominant image of the selected web page. In block 503, the component selects the next dominant image of the selected web page. In decision block 504, if all the dominant images of the selected web page have already been selected, then the component continues at block 507, else the component continues at block 505. In block 505, the component invokes the calculate query relevance component to calculate the query relevance of the selected dominant image to the query. In block 506, the component calculates the overall relevance of the selected dominant image to the query as a weighted linear combination of the dominance score of the selected image and the calculated query relevance. Alternatively, the component may use nonlinear weighting. The component then loops to block 503 to select the next dominant image of the selected web page. In block 507, the component selects the image of the selected web page with the highest overall relevance as the most relevant image and then loops to block 501 to select the next web page of the query result.

FIG. 6 is a flow diagram that illustrates the processing of the calculate query relevance component of the searching system in one embodiment. The component is passed a query and an image and returns the query relevance for that image. In blocks 601-604, the component loops calculating the similarity for a text feature (e.g., surrounding text, title, and file name) and combining the similarities to calculate the query relevance. In block 601, the component selects the next text feature. In decision block 602, if all the text features have already been selected, then the component returns the query relevance, else the component continues at block 603. In block 603, the component calculates the similarity of the selected text feature to the query using Equation 10. Alternatively, the component may use any of various well-known similarity metrics. In block 604, the component adds that the weighted similarity to the query relevance using Equation 11 and then loops to block 601 to select the next text feature.

Figure 7:
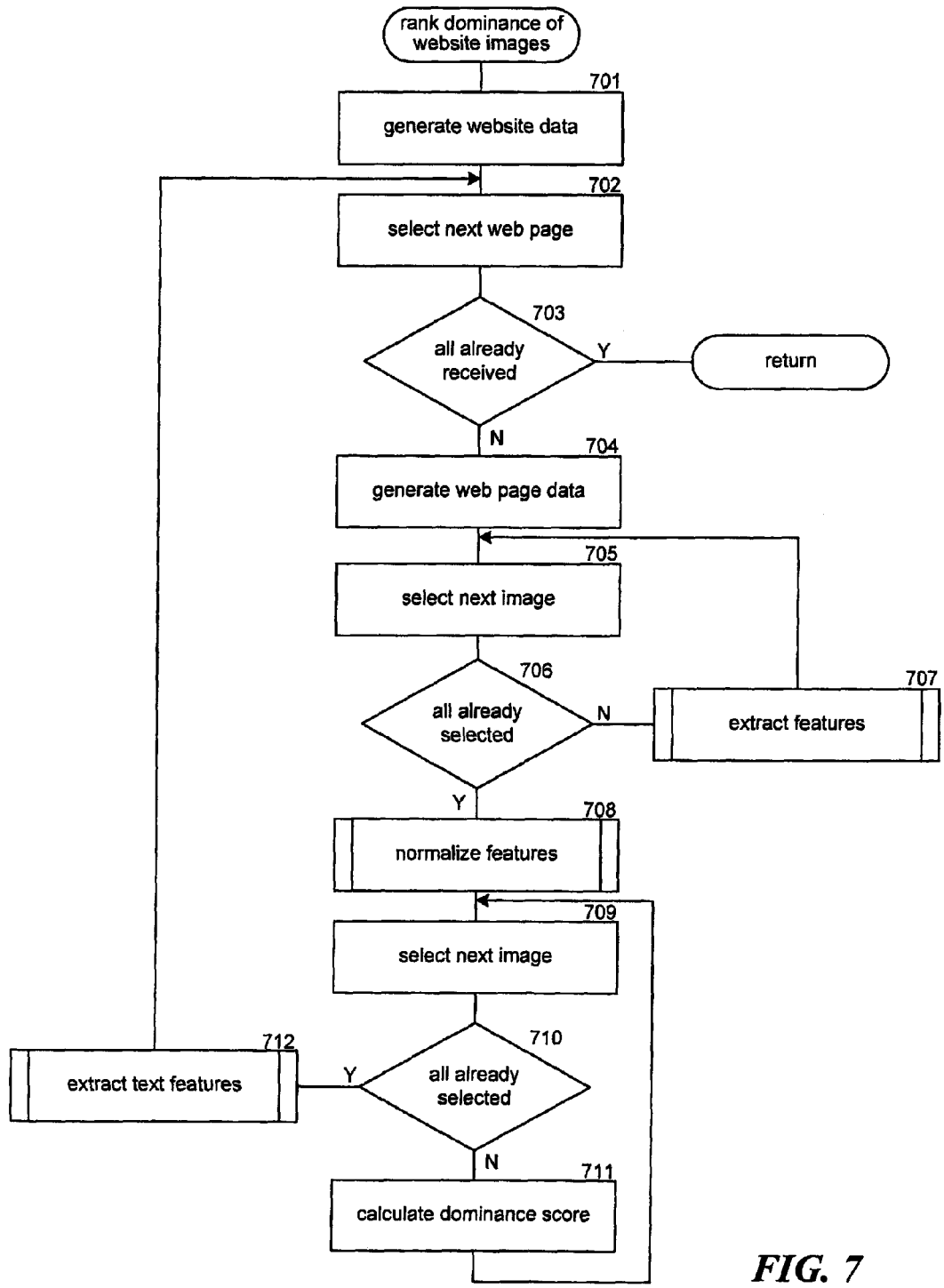
FIG. 7 is a flow diagram that illustrates the processing of the rank dominance of web site images component in one embodiment.

FIG. 7-14 are flow diagrams that illustrate the processing of components of the ranking system of the dominance system in one embodiment. FIG. 7 is a flow diagram that illustrates the processing of the rank dominance of web site images component in one embodiment. The component generates the dominance scores for the images of the web pages of the web site and extracts the text features associated with an image for use in calculating the similarity of an image to a query. In block 701, the component generates the web site data needed to determine the web site level features, such as by invoking an identify duplicate images component. In blocks 702-712, the component loops selecting each web page of the web site. In block 702, the component selects the next web page of the web site. In decision block 703, if all the web pages of the web site have already been selected, then the component returns, else the component continues at block 704. In block 704, the component generates the web page data needed to determine the page level features. In blocks 705-707, the component loops extracting the features for each image of the selected web page. In block 705, the component selects the next image of the selected web page. In decision block 706, if all the images have already been selected, then the component continues at block 708, else the component continues at block 707. In block 707, the component invokes the extract features component to extract the features of the selected image and loops to block 705 to select the next image. In block 708, the component invokes the normalize features component to normalize the features of the images of the web page. In blocks 709-711, the component loops calculating a dominance score for each image of the select web page. In block 709, the component selects the next image of the selected web page. In decision block 710, if all the images have already been selected, then the component continues at block 712, else the component continues at block 711. In block 711, the component calculates the dominance score for the selected image and then loops to block 709 to select the next image. In block 712, the component invokes the extract text features component to extract text features for each image and then loops to block 702 to select the next web page.

Figure 8:
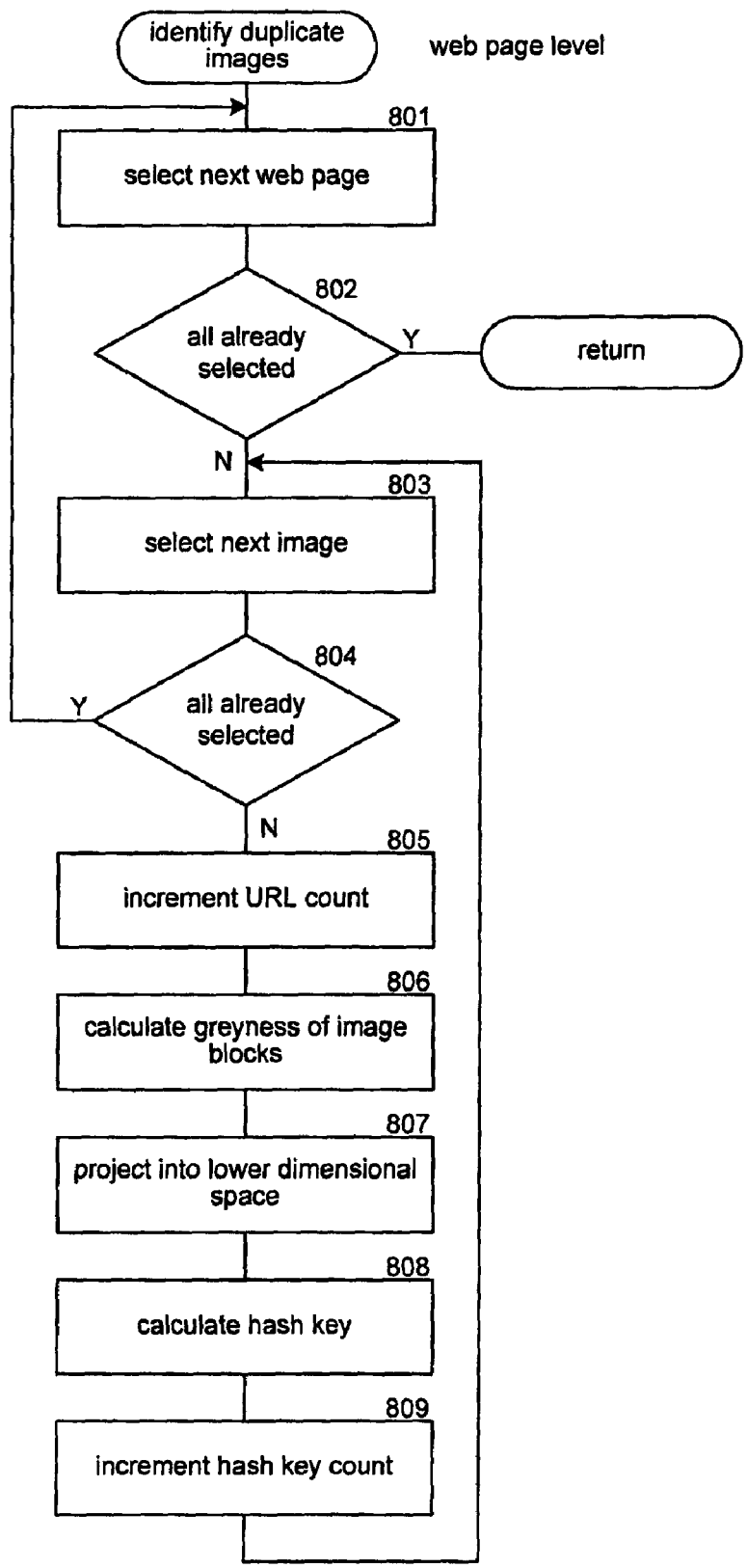
FIG. 8 is a flow diagram that illustrates the processing of the identify duplicate images component of the ranking system in one embodiment.

FIG. 8 is a flow diagram that illustrates the processing of the identify duplicate images component of the ranking system in one embodiment. The component is passed the web pages of a web site and determines whether each image of the web site is duplicated on multiple web pages. In blocks 801-809, the component loops selecting each web page of the web site. In block 801, the component selects the next web page of the web site. In decision block 802, if all the web pages of the web site have already been selected, then the component returns, else the component continues at block 803. In blocks 803-809, the component loops selecting each image of the selected web page and incrementing a count of the number of times that the selected image appears on a web page of the web site. In block 803, the component selects the next image of the selected web page. In decision block 804, if all the images of the selected web page have already been selected, then the component loops to block 801 to select the next web page, else the component continues at block 805. In block 805, the component increments a count associated with the identifier (e.g., URI) of the selected image. In blocks 806-809, the component increments a count associated with a hash key of the image. The component generates the hash key to help identify duplicate images that may be identified with different URIs. In block 806, the component divides the image into a certain number of blocks (e.g., 64) and calculates the grayness of each block. The image is represented by a vector of the grayness values. In block 807, the component projects the vector into a lower dimensional space (e.g., 16 dimensions) using, for example, principal component analysis. In block 808, the component calculates a hash key from the projected vector. In block 809, the component increments a count associated with a hash key. The component then loops to block 803 to select the next image. Each image may be associated with the count for its URI and the count for its hash key.

Figure 9:
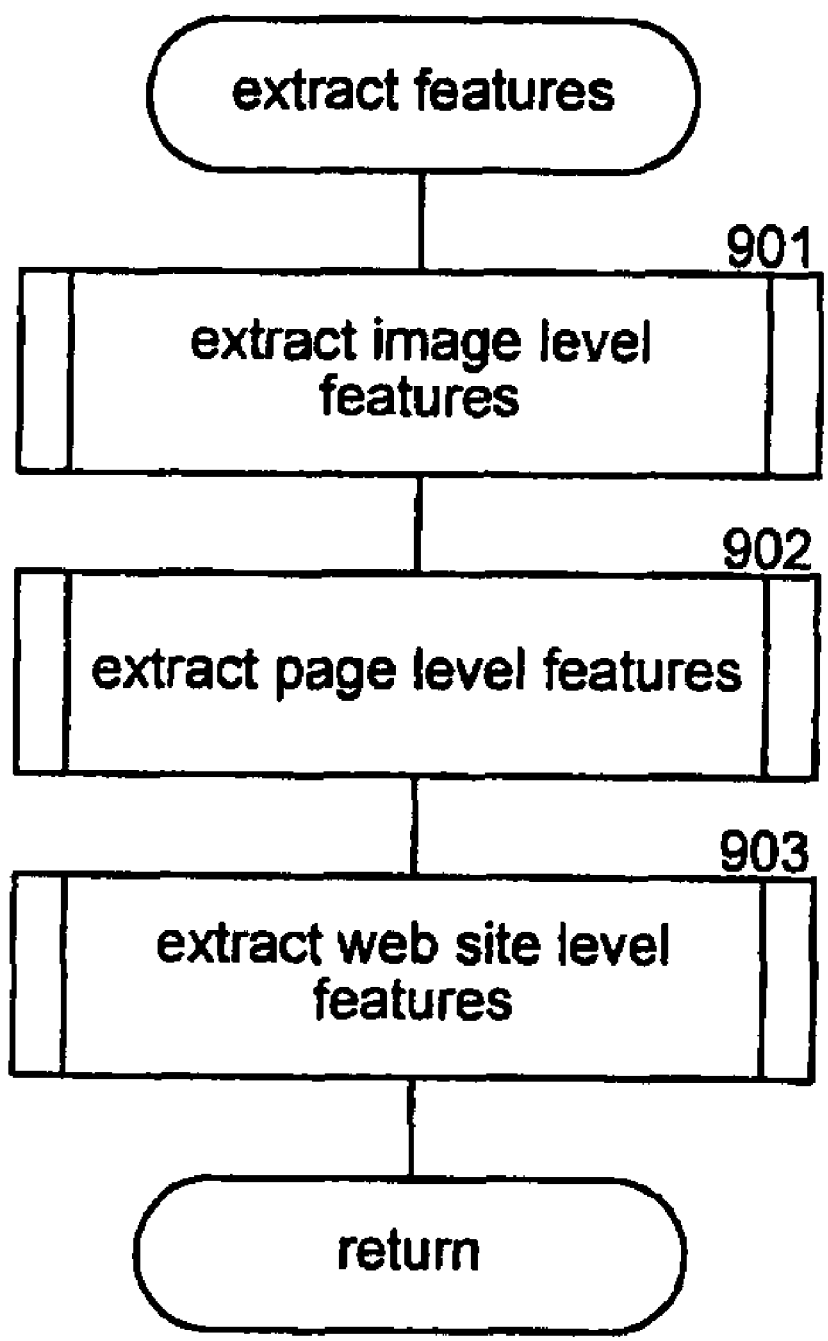
FIG. 9 is a flow diagram that illustrates the processing of the extract features component of the ranking system in one embodiment.

FIG. 9 is a flow diagram that illustrates the processing of the extract features component of the ranking system in one embodiment. In block 901, the component invokes an extract image level features component. In block 902, the component invokes an extract page level features component. In block 903, the component invokes an extract web site level features component and then returns.

Figure 10:
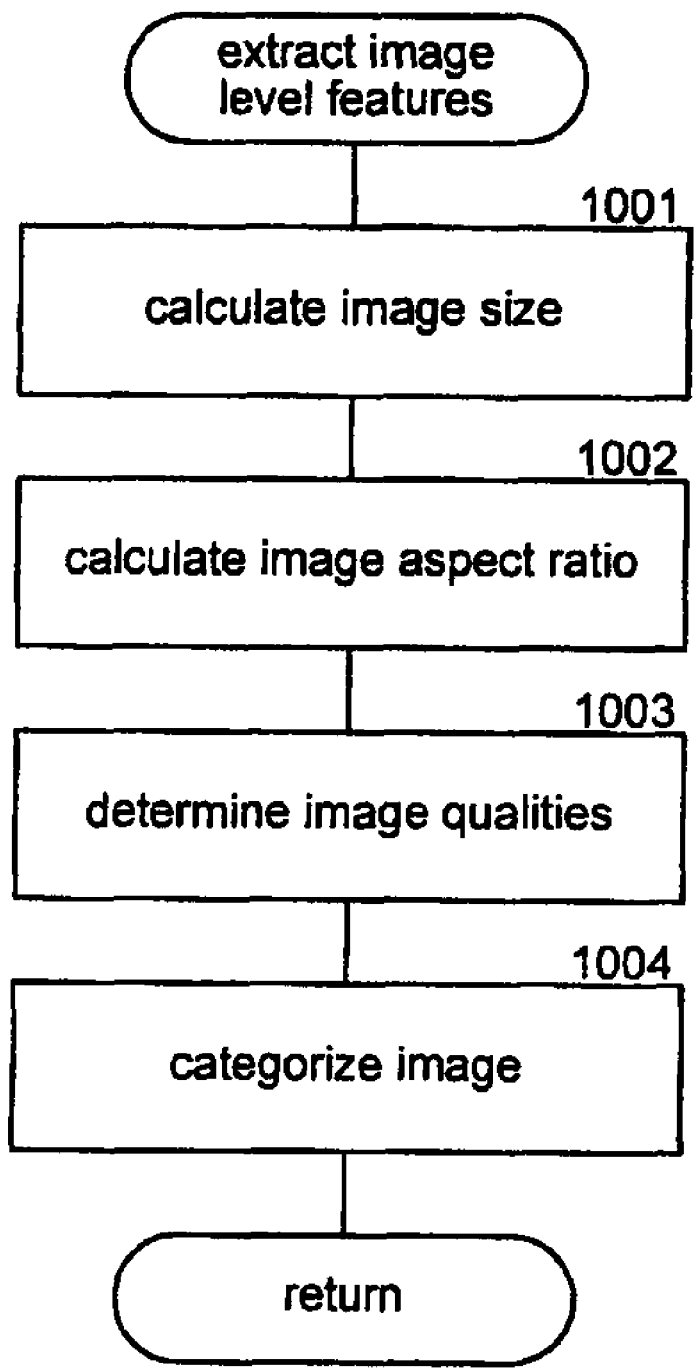
FIG. 10 is a flow diagram that illustrates the processing of the extract image level features component in one embodiment.

FIG. 10 is a flow diagram that illustrates the processing of the extract image level features component in one embodiment. The component is passed an indication of an image and returns its image level features. In block 1001, the component calculates the image size. In block 1002, the component calculates the image aspect ratio. In block 1003, the component determines the image qualities, such as colorfulness or blurness. In block 1004, the component categorizes the image.

Figure 11:
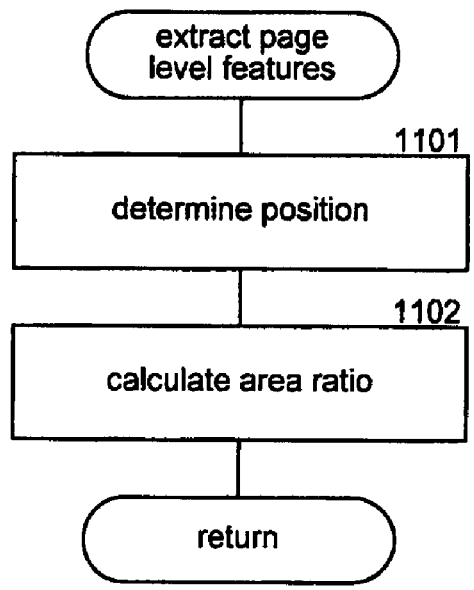
FIG. 11 is a flow diagram that illustrates the processing of the extract page level features component in one embodiment.

FIG. 11 is a flow diagram that illustrates the processing of the extract page level features component in one embodiment. The component is passed an indication of a web page and an image and returns the page level features of the image. In block 1101, the component determines the position of the image on the web page. In block 1102, the component calculates the area ratio of the image to the web page and then returns.

Figure 12:
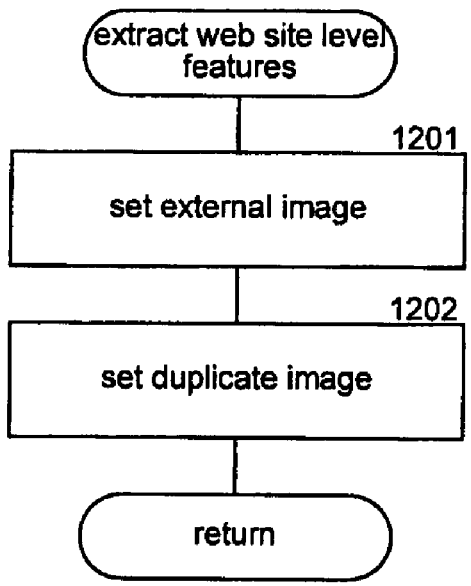
FIG. 12 is a flow diagram that illustrates the processing of the extract web site level features component in one embodiment.

FIG. 12 is a flow diagram that illustrates the processing of the extract web site level features component in one embodiment. The component is passed an indication of an image and returns the web site level features of that image. In block 1201, the component sets a feature indicating whether the image is hosted on an external web site. In block 1202, the component sets a feature indicating whether the image is duplicated on the web site. The component then returns.

Figure 13:
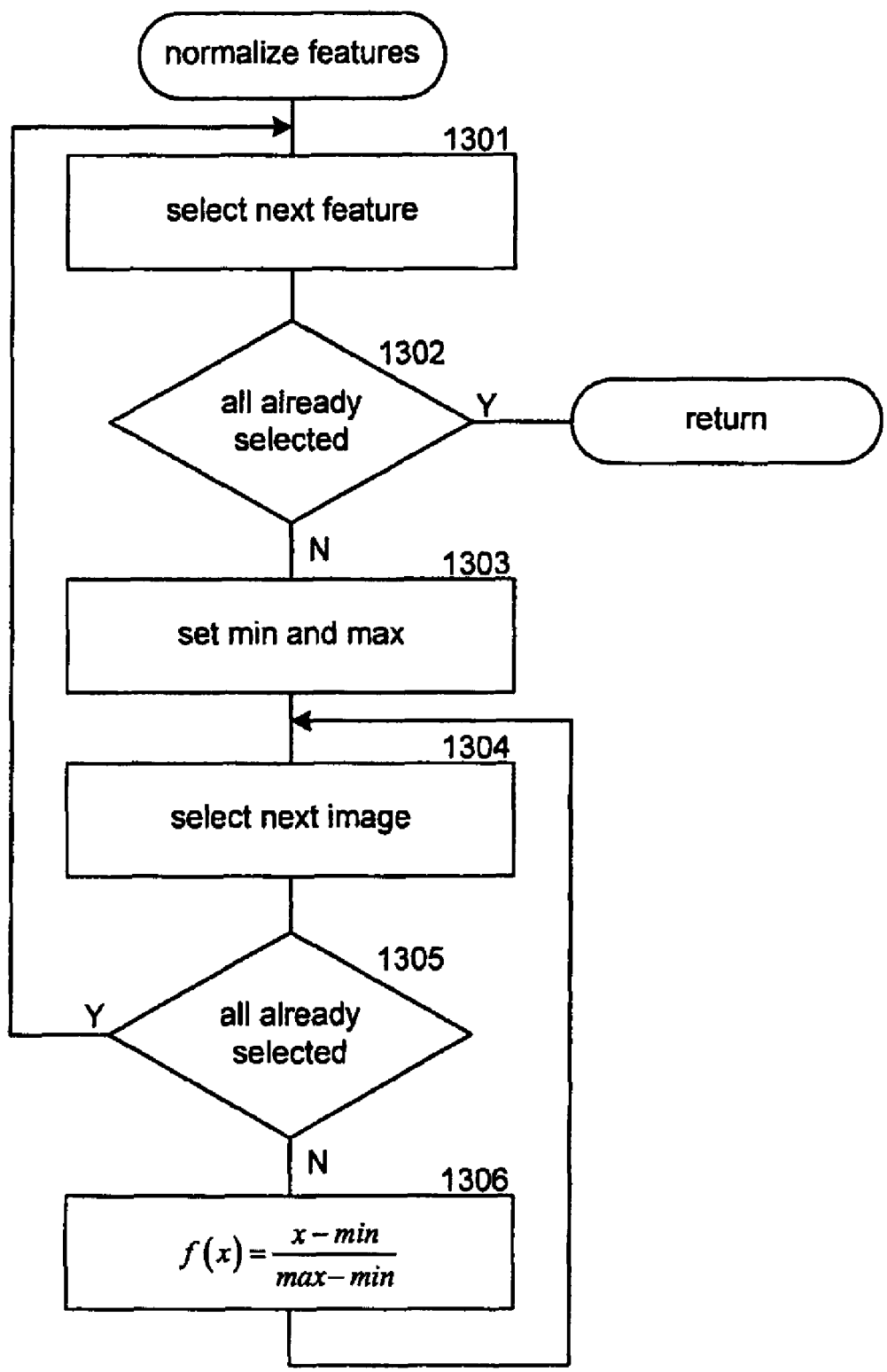
FIG. 13 is a flow diagram that illustrates the normalize features component of the ranking system in one embodiment.

FIG. 13 is a flow diagram that illustrates the normalize features component of the ranking system in one embodiment. The component is passed the extracted features of the images of a web page and returns the normalized features of the images. In block 1301, the component selects the next feature. In decision block 1302, if all the features have already been selected, then the component returns, else the component continues at block 1303. In block 1303, the component sets the minimum and maximum values of the selected feature for the images. In blocks 1304-1306, the component loops calculating the normalized value of the selected feature for each image. In block 1304, the component selects the next image. In decision block 1305, if all the images have already been selected, then the component loops to block 1301 to select the next feature, else the component continues at block 1306. In block 1306, the component calculates the normalized value of the selected feature of the selected image and then loops to block 1304 to select the next image.

Figure 14:
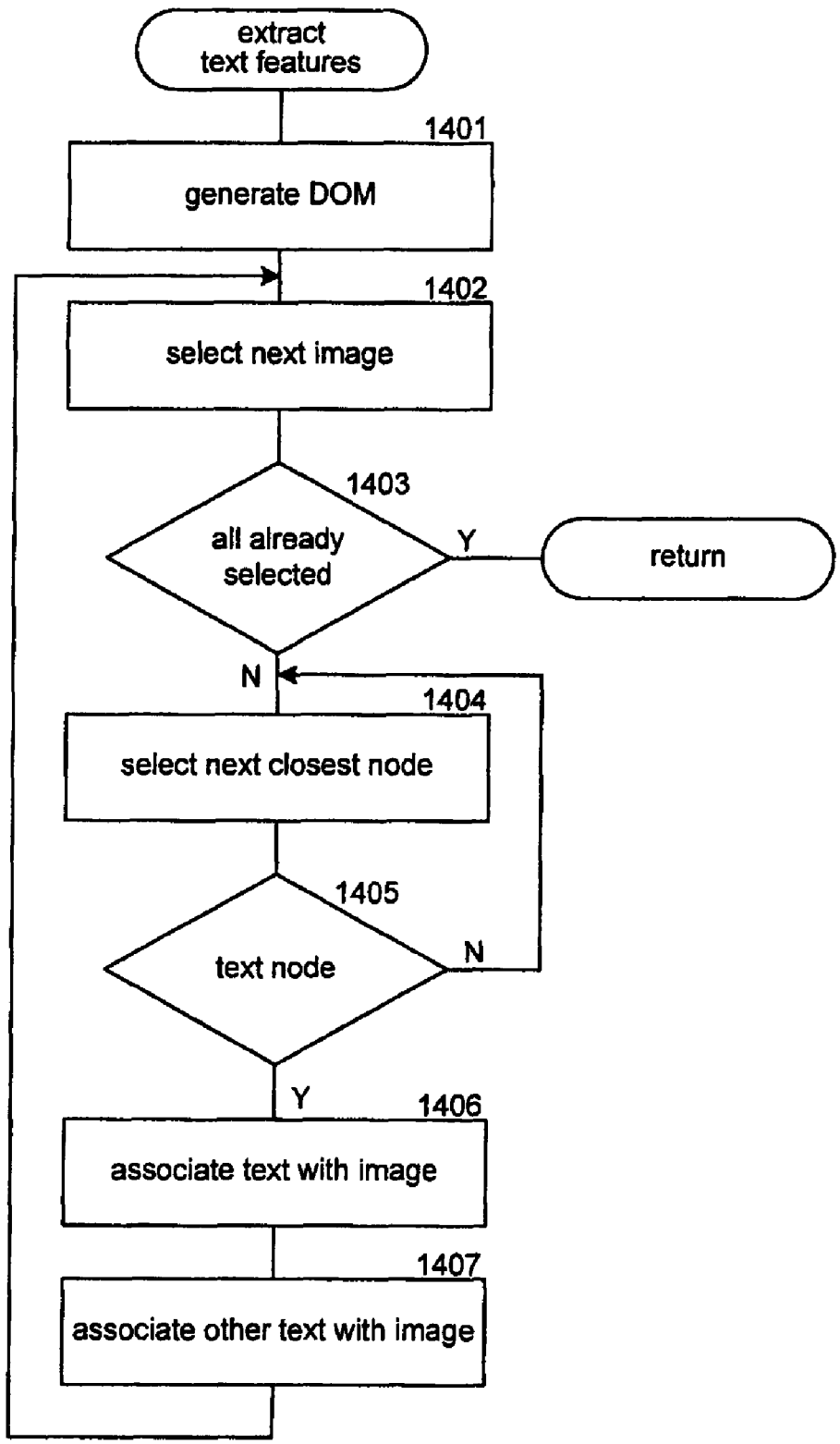
FIG. 14 is a flow diagram that illustrates the processing of the extract text features component of the ranking system in one embodiment.

FIG. 14 is a flow diagram that illustrates the processing of the extract text features component of the ranking system in one embodiment. The component is passed a web page and identifies the text surrounding each image and other text features. In block 1401, the component generates a DOM representation of the web page. In blocks 1402-1407, the component loops selecting each image of the web page and identifying its surrounding text. In block 1402, the component selects the next image of the web page. In decision block 1403, if all the images of the web page have already been selected, then the component returns, else the component continues at block 1404. In blocks 1404-1405, the component loops searching for the closest node in the DOM representation that includes text. In block 1404, a component selects the next closest node starting at the image. In decision block 1405, if the selected node contains text, then the component continues at block 1406, else the component loops to block 1404 to select the next closest node. In block 1406, the component associates the text with the selected image. In block 1407, the component associates other text features with the image, such as title and file name. The component then loops to block 1402 to select the next image.

Figure 15:
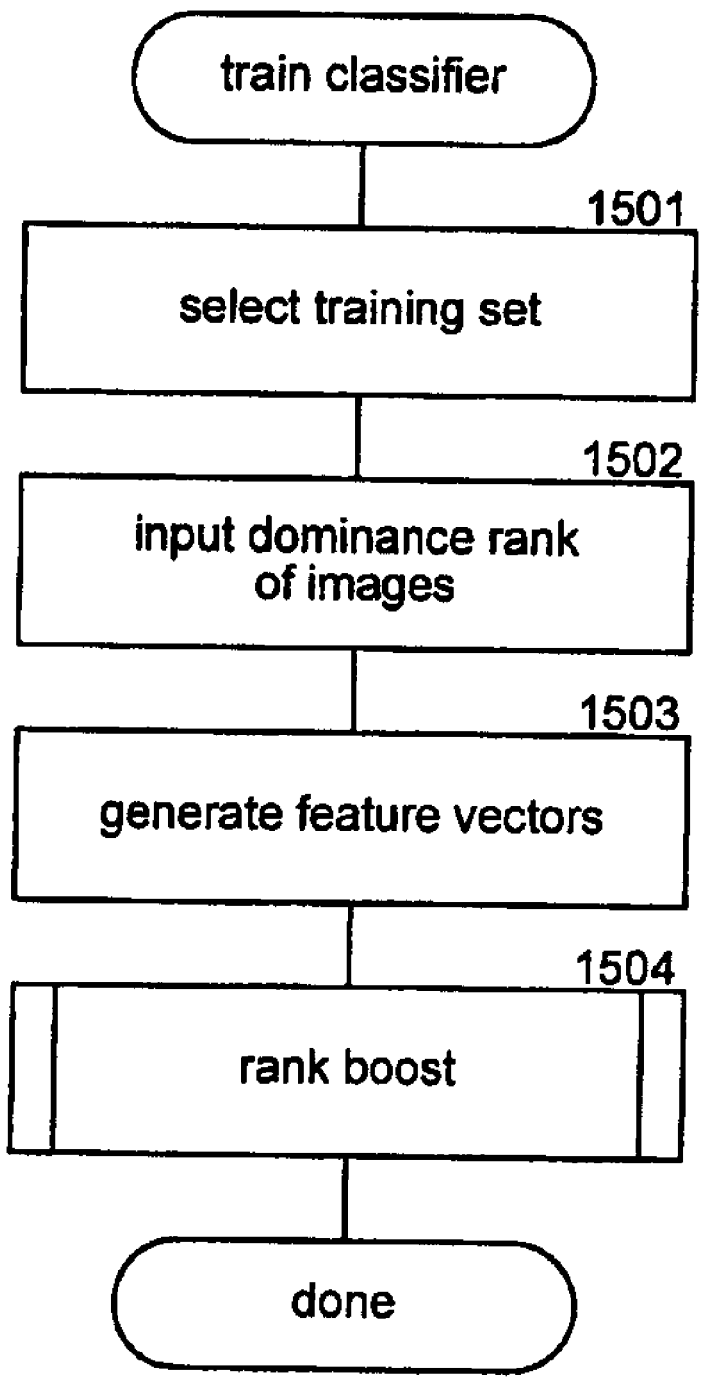
FIG. 15 is a flow diagram that illustrates the processing of the train classifier component of the training system in one embodiment.
Figure 16:
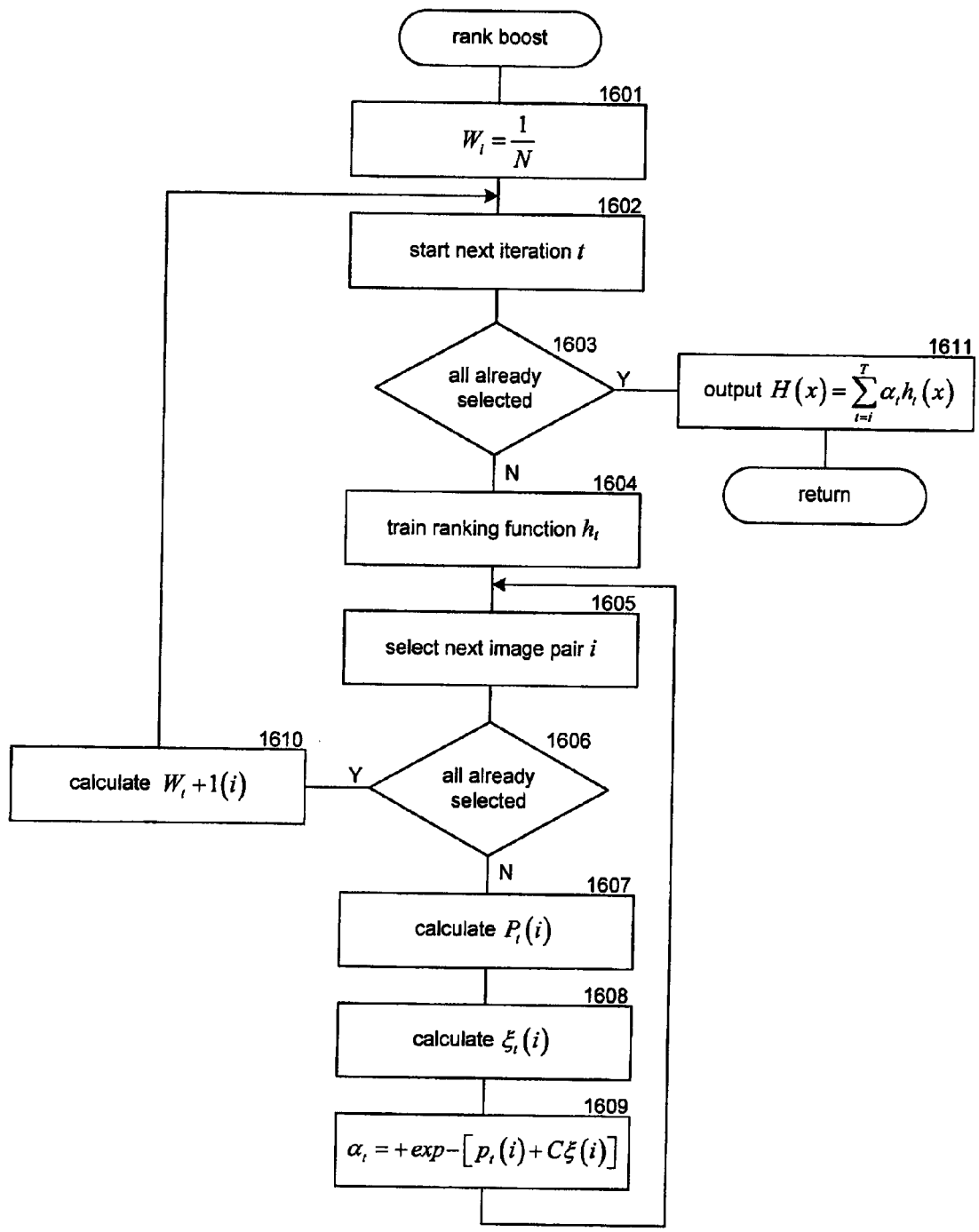
FIG. 16 is a flow diagram that illustrates the processing of the RankBoost component of the training system in one embodiment.

FIGS. 15-16 are flow diagrams that illustrate the processing of components of the training system of the dominance system in one embodiment. FIG. 15 is a flow diagram that illustrates the processing of the train classifier component of the training system in one embodiment. In block 1501, the component selects the training set of data. In block 1502, the component inputs the dominance rank (e.g., class) of the images of the training set. In block 1503, the component generates the feature vectors for the images of the training set. In block 1504, the component invokes the RankBoost component to train the classifier and then completes.

FIG. 16 is a flow diagram that illustrates the processing of the RankBoost component of the training system in one embodiment. In block 1601, the component initializes the weight of each pair of images of the training set. In block 1602, the component starts the next iteration of the training. In decision block 1603, if all the iterations have already been started, then the component continues in block 1611, else the component continues at block 1604. In block 1604, the component trains a weak ranking function. In blocks 1605-1609, the component loops calculating the weighting factor of the trained ranking function. In block 1605, the component selects the next image pair of the training set. In decision block 1606, if all the image pairs have already been selected, then the component continues at block 1610, else the component continues at block 1607. In block 1607, the component calculates the difference between the dominance scores of the images of the selected pair. In block 1608, the component calculates the average weight of the selected image pair. In block 1609, the component adjusts the weighting factor based on the selected image pair and then loops to block 1605 to select the next image pair. In block 1610, the component calculates the new weights for the image pairs and then continues at block 1602 to start the next iteration. In block 1611, the component outputs the trained classifier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-readable storage device containing computer-executable instructions for determining dominance of media elements of display pages, the computer-executable instructions for performing a method comprising:
providing a scoring mechanism for scoring dominance of a media element of display pages based on features of each media element;
identifying media elements of a display page;
for each identified media element, identifying the features of the media element; and
scoring the identified media element of the display page using the provided scoring mechanism and the identified features of each media element.

2. The computer-readable storage device of claim 1 wherein the media elements are images.

3. The computer-readable storage device of claim 2 wherein the display page is part of a query result and including displaying a most dominant image of the display page based on the scoring as part of the query result.

4. The computer-readable storage device of claim 2 wherein the features include image level features and display page level features.

5. The computer-readable storage device of claim 4 wherein the display page is a web page and the features further include web site level features.

6. The computer-readable storage device of claim 2 wherein the features are selected from the group consisting of image size, image aspect ratio, image quality, and image category.

7. The computer-readable storage device of claim 2 wherein the features are selected from the group consisting of display page position of image and ratio of image area to display page area.

8. The computer-readable storage device of claim 2 wherein the display page is a web page of a web site and the features are selected from the group consisting of an indicator of whether the image is provided by the web site and an indication of whether the image occurs frequently on the web pages of the web site.

9. A computer-readable storage device containing computer-executable instructions for providing query results of a query for web pages, the computer-executable instructions when executed by a computing device for performing a method comprising:
providing an indication of dominance of images of web pages;
receiving an indication of web pages of a query result; and
for each of the web pages,
identifying a most relevant image of the web page based on the indicated dominance of the images; and
providing the identified image as part of the query result.

10. The computer-readable storage device of claim 9 wherein dominance of an image is determined using a classifier that is trained to score dominance of images of web pages.

11. The computer-readable storage device of claim 10 wherein the dominance of images of web pages is determined before web pages of the query result are identified.

12. The computer-readable storage device of claim 10 wherein the dominance of images of web pages is determined based on recent crawling of a web site.

13. The computer-readable storage device of claim 10 wherein the classifier is trained by generating a feature vector for each image of a web page, normalizing the feature vectors for the images of the web page, and receiving an indication of dominance of each image.

14. The computer-readable storage device of claim 9 wherein the relevance of an image is further based on similarity of the query to text surrounding the image.

15. The computer-readable storage device of claim 9 wherein the dominance of images of a web page s determined after the web page is included in a query result.

16. The computer-readable storage advice of claim 9 wherein the images are represented by features selected from the group consisting of image size, image aspect ratio, image quality, and image category.

17. A computing device for presenting a query result of a query for web pages, the computing device comprising:
   a memory storing computer-executable instructions of:
   a component that receives a query for web pages;
   a component that submits the query to a search engine to generate a query result;
   a component that receives a generated query result that identifies web pages and dominant images of the web pages; and
   a component that displays an indication of the web pages and the dominant images of the web pages; and
   a processor that executes the computer-executable instructions stored in the memory.

18. The computing device of claim 17 including a component that displays text associated with the web pages.

19. The computing device of claim 17 wherein dominance of an image of a web page is determined by the search engine before receiving the query.

20. The computing device of claim 17 wherein dominance of an image of a web page is determined using a classifier that is trained on a training set of images of web pages that have been manually classified based on dominance.

* * * * *